June 28, 1932.  J. DANIEL  1,865,087
MULTIPLANE ADJUSTING AND ADJUSTMENT SECURING MEANS
Filed Nov. 11, 1929  2 Sheets-Sheet 1
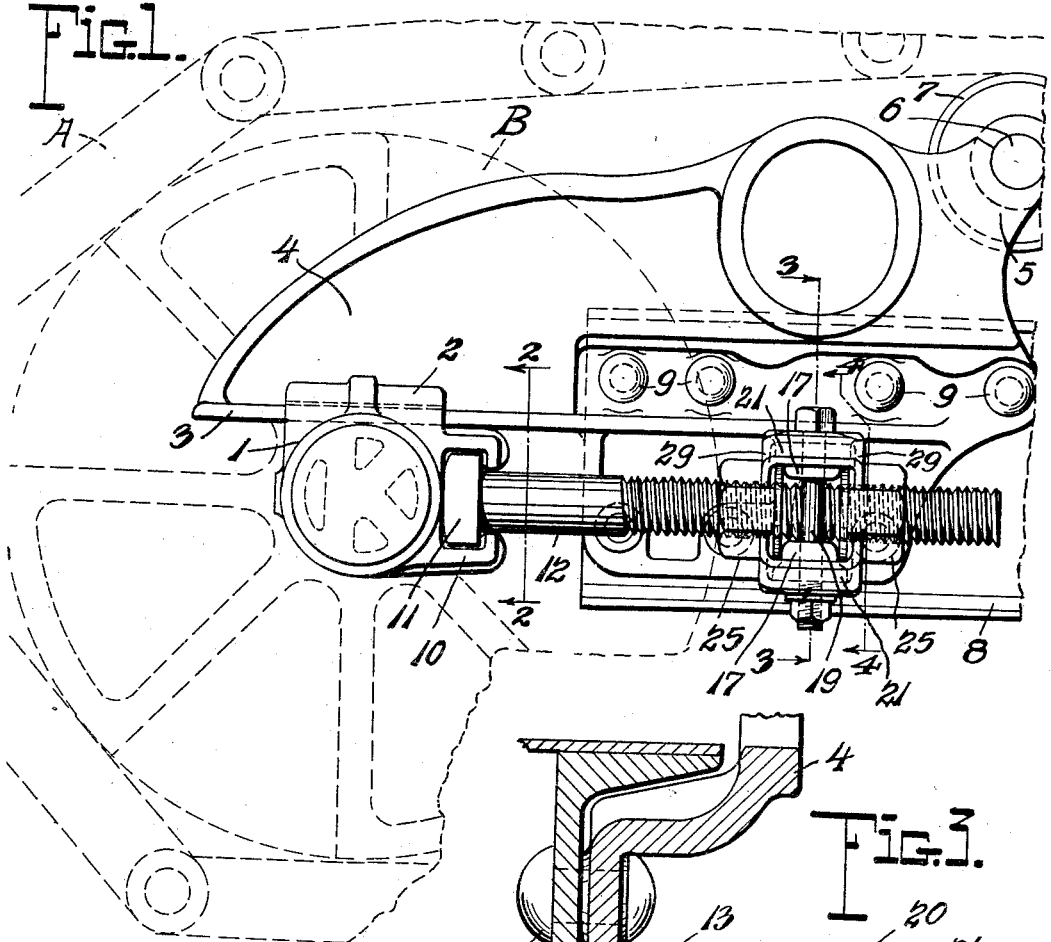
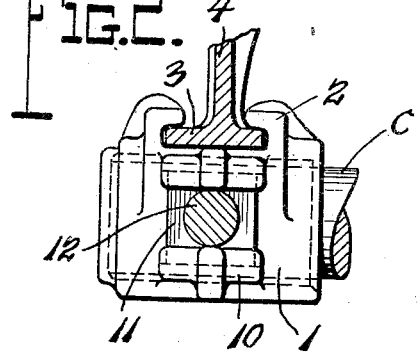
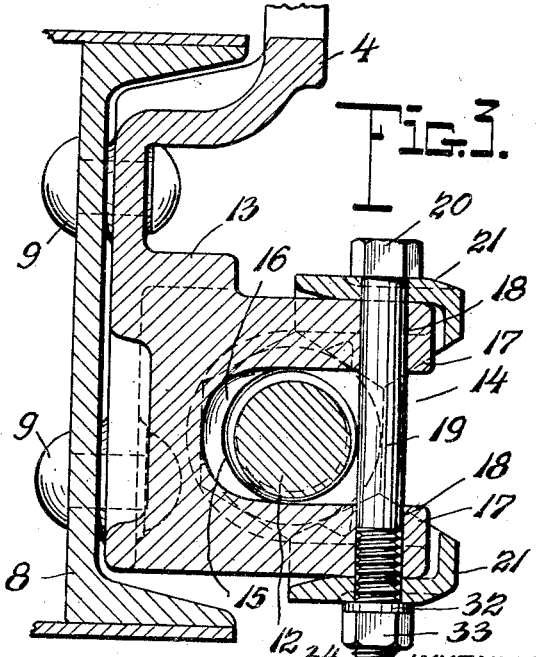
INVENTOR
John Daniel.
BY
ATTORNEYS

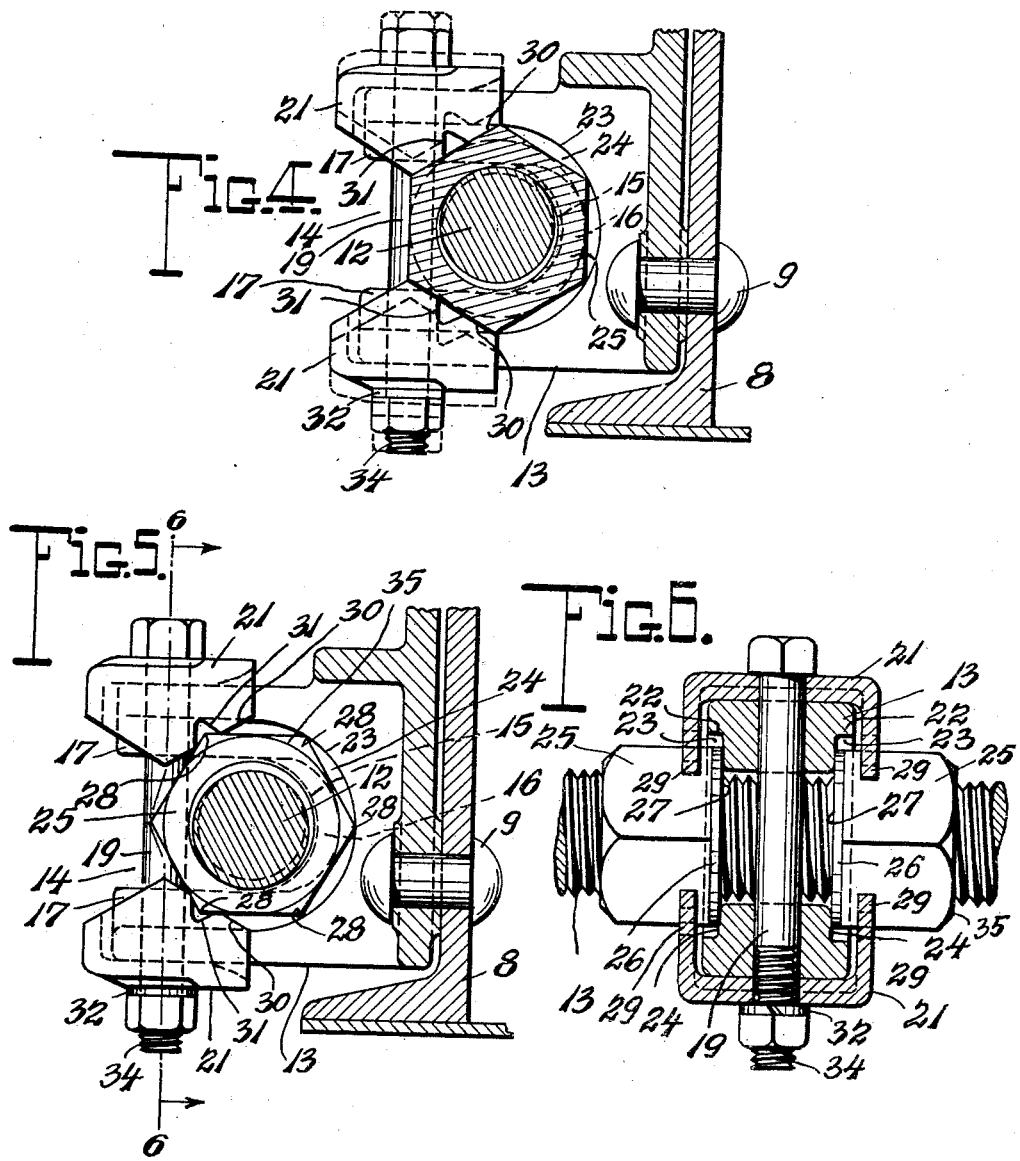

Patented June 28, 1932

1,865,087

UNITED STATES PATENT OFFICE

JOHN DANIEL, OF MILWAUKEE, WISCONSIN, ASSIGNOR TO KOEHRING COMPANY, OF MILWAUKEE, WISCONSIN, A CORPORATION

MULTIPLANE ADJUSTING AND ADJUSTMENT SECURING MEANS

Application filed November 11, 1929. Serial No. 406,448.

This invention relates to traction devices for pavers and the like, primarily of the multiplane type.

In devices of this type means have heretofore been employed for adjusting the relative positions of the front and rear tumblers mounted on axle spindles, to take up slack in the multiplanes. In use such adjusting means oftentimes become rusty so that it is impossible to remove them without considerable difficulty.

It is one of the primary objects of my invention to overcome this and other difficulties, and to this end I avail of instrumentalities applied to spindle adjusting means whereby to positively lock the latter against removal yet which facilitates removal when desired.

More particularly, I locate the heads of bolts in portions of the axle spindle bearing frames whereby the bolts are prevented from turning. To the ends of the traction framework, adjacent said bearing frames, I secure brackets in which the bolts are received. Nuts are applied to the bolts in tight engagement with opposite sides of the brackets. I employ a novel appliance by which nut locks are detachably held in engagement with the nuts, said appliance providing the additional function of detachably locking the adjusting bolt against inadvertent removal or loss from the bracket. When desired, the parts may be disassembled or replaced as the need arises.

With these and other objects and advantages in view, my invention comprises certain other combinations, constructions, and arrangements of parts as will be subsequently specified and claimed.

For a full and more complete understanding of the invention, reference may be had to the following description and accompanying drawings, in which—

Figure 1 is a fragmentary side elevation of the front end of a multiplane traction device, the tractive elements being shown diagrammatically in dotted lines and the details of my invention in full lines.

Figure 2 is a fragmentary sectional view taken on the line 2—2 of Figure 1.

Figure 3 is a fragmentary sectional view taken on the line 3—3 of Figure 1.

Figure 4 is a fragmentary sectional view taken on the line 4—4 of Figure 1, showing one mode of use of the nut locks.

Figure 5 is a view similar to Figure 4, but showing the bolt nut in elevation and a different mode of use of the nut locks, and Figure 6 is a fragmentary view taken on the line 6—6 of Figure 5.

While a preferred specific embodiment of the invention is herein set forth, it is to be understood that I am not to be limited to the exact constructions illustrated and described, because various modifications of these details may be provided in putting the invention into practice within the purview of the appended claims.

Referring more particularly to the drawings, reference character A designates a multiplane operatively applied to a tumbler B mounted on a tumbler shaft C, rotatable in an adjusting bearing 1. The bearing 1 is provided with a flanged, substantially U-shaped upper portion 2 in which the lower flanged edge 3 of a bridle 4 is slidably received. The bridle is of substantially I beam construction and is provided with a boss 5 in the form of a bearing which supports one end of a spindle 6 carrying an idler roller 7. It is to be understood that oppositely disposed from the bridle 4 is another bridle supporting the other end (not shown) of the spindle 6. The bridle 4 is secured to the traction framework 8 as by rivets 9.

Disposed at about a right angle with the portion 2 of the bearing 1 is a second flanged, substantially U-shaped portion 10 slidably and non-rotatably receiving the flat sided head 11 of an adjusting bolt 12. Projecting laterally from the bridle 4 is a bracket 13 which may be integral with or secured to the bridle or the framework in any suitable way. The bracket has a bolt receiving slot 14. The bottom wall 15 of the slot is rounded and has a radius of curvature slightly greater than that of the extremities of the bolt threads, whereby contact of said threads with said wall is prevented. Said wall is recessed at 16 intermediate its ends for the purpose, among others, of providing a pocket for receiving foreign matter to thereby minimize interference with adjustment of the bolt 12. The bolt 12 is received in the slot 14, the arms 17 of the bracket projecting laterally beyond the bolt and providing aligned holes 18 in which a securing member 19 is received, the shank of the latter flanking one side of the bolt 12. Located between the ends of the securing member 19 and the arms 17 are U-shaped nut lock clips 21 which straddle the arms 17. The application of these clips is described hereinafter.

The ends of the slot 14 are enlarged at 22, thereby providing U-shaped bearing surfaces 23 at substantially right angles to U-shaped bearing surfaces 24. Between the bracket and the nuts 25 threaded on the bolt 12 washers 26 are disposed. The depth of the recesses 22 is greater than the thickness of the washers 26, so that when the contacting surfaces 27 of the washers bear against the surfaces 24, certain of the corners 28 of the nuts engage the arcuate bearing surfaces 23. Thus the bolt 12 is centered in the slot 14 of the bracket 13 and, since the width of the slot and the diameter of the wall 15 is slightly greater than the diameter of the bolt, the threads are always out of contact with the walls of the slot 14 so that mutilation of the threads is prevented.

The arms 29 of the clips 21 are provided with inclined sides 30 which are adapted to engage one of the sides of the nuts 25 to prevent rotation of the nuts and thereby lock the nuts in the desired adjustment. It is to be understood that while I have here illustrated hexagon nuts, I may instead use nuts having a different number of sides, in which event the inclination of the sides 30 will be correspondingly different. These sides 30 may be provided intermediate their ends with notches 31 adapted to receive corners 28 of the nuts as shown in Figures 5 and 6. It is therefore evident that the sides 30 and notches 31 cooperate with the sides and corners of the nuts to provide for minute adjustments.

The clips 21 are held detachably yet securely in nut locking position by the lock washer 32 and nut 33 on the threaded end 34 of the member 19, though any other suitable securing means may be employed.

On the old type machine the bolts 12 passed through a hole in the frame instead of the open end slot 14. In order to remove a bolt 12 it was necessary to draw it out endways by moving it to the left in Figure 1. In practice the adjusting nuts 25 and bolts 12 often became so rusty that adjustment was impossible and a hack saw was necessary to remove the bolt, before a new one could be inserted. With the construction used on the new paver, this same rusting may occur but in such cases the small bolt 19 can be easily broken with a chisel, or hack saw, and the bolt 12 removed sideways.

Further advantage of the side removal is that the endless track does not have to be broken when removing bolts 12. With the old style machine, the sprocket B had to be advanced before a bolt 12 could be drawn out. Since the endless track limited the extent to which sprocket B could be advanced, it was often necessary to break the track in order to advance the sprocket sufficiently to allow the bolt 12 to be withdrawn.

Having thus described my invention, what I claim as new and desire to secure by Letters Patent of the United States, is—

1. In a device of the character described, wherein a pair of tumblers are mounted on shafts separated by a framework, means for adjusting each of the tumblers with respect to the framework, said means including an adjusting bearing for a shaft, a U-shaped bracket secured to the framework, a bolt having its head secured to the bearing and its shank projecting through the bracket, means bridging the arms of said bracket to prevent lateral removal of the bolt, nuts threaded on said shank on opposite sides of the part through which said shank projects, and means for positively locking said nuts against rotation relative to said shank, the said bracket having end recesses whose innermost walls are arcuate and of the same curvature as the circle circumscribed about the corners of the nuts, said corners engaging said arcuate walls whereby to center said bolt relative to said bracket.

2. In a tumbler adjustment for endless tractors, a tumbler shaft bearing, a bolt having a head and a shank, the head being secured to said bearing, an adjustment bracket through which said shank extends, a frame, a bracket on the frame having a U-shaped slot therein in which the shank is received transversely of the bracket, a connector joining the ends of the slot walls to maintain the shank in operative position, a locking nut on said shaft adapted to engage said bracket, and a clip secured to said bracket by said connector, said clip engaging said locking nut to prevent rotation of the same.

In testimony whereof I affix my signature.

JOHN DANIEL.